(12) United States Patent
Lv et al.

(10) Patent No.: US 10,106,084 B2
(45) Date of Patent: Oct. 23, 2018

(54) VEHICLE-MOUNTED DISPLAY SYSTEM AND VEHICLE

(71) Applicant: BOE TECHNOLOGY GROUP CO., LTD., Beijing (CN)

(72) Inventors: Xuewen Lv, Beijing (CN); Jing Su, Beijing (CN); Yanshun Chen, Beijing (CN); Wenbo Li, Beijing (CN); Xinyin Wu, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 172 days.

(21) Appl. No.: 14/907,787

(22) PCT Filed: Jul. 22, 2015

(86) PCT No.: PCT/CN2015/084736
§ 371 (c)(1),
(2) Date: Jan. 26, 2016

(87) PCT Pub. No.: WO2016/150047
PCT Pub. Date: Sep. 29, 2016

(65) Prior Publication Data
US 2017/0050564 A1 Feb. 23, 2017

(30) Foreign Application Priority Data

Mar. 20, 2015 (CN) .................... 2015 2 0161621 U
Apr. 8, 2015 (CN) .................... 2015 2 0207405 U (51) Int. Cl.
*G03B 21/604* (2014.01)
*G02B 27/01* (2006.01)
(Continued)

(52) U.S. Cl.
CPC ............... *B60R 1/00* (2013.01); *B60K 35/00* (2013.01); *B62D 15/028* (2013.01);
(Continued)

(58) Field of Classification Search
CPC ...... G03B 21/604; G03B 21/56; G03B 21/60; G02B 27/0101; G02B 27/01
See application file for complete search history.

(56) References Cited

U.S. PATENT DOCUMENTS 8,638,411 B2   1/2014  Park et al.
2003/0214632 A1  11/2003  Ma et al.
(Continued)

FOREIGN PATENT DOCUMENTS

CN   1584671 A   2/2005
CN   1653386 A   8/2005
(Continued)

OTHER PUBLICATIONS

Yin et al.; CN102736249A; Machine Translation in English.*
International Search Report and Written Opinion for Application No. PCT/CN2015/084736, dated Dec. 11, 2015, 13 Pages.

*Primary Examiner* — Ryan Howard
(74) *Attorney, Agent, or Firm* — Brooks Kushman P.C.

(57) ABSTRACT

The present disclosure provides a vehicle-mounted display system and a vehicle. The vehicle-mounted display system includes a transparent projection screen and a projector configured to project an image onto the transparent projection screen. A first polarizer is attached onto a lens of the projector, and a second polarizer is attached onto the transparent projection screen. The second polarizer has a polarization transmission direction crossing a polarization transmission direction of the first polarizer at such an angle as to enable a light beam from the projector and passing through the first polarizer and the second polarizer to be of an intensity smaller than an intensity of a light beam capable of being recognized by human eyes. The second polarizer has a polarization reflection direction perpendicular to its polar-
(Continued)

ization transmission direction, so as to reflect a light component in the polarization reflection direction.

18 Claims, 3 Drawing Sheets

(51) Int. Cl.
*B60R 1/00* (2006.01)
*B60K 35/00* (2006.01)
*B62D 15/02* (2006.01)
*G02F 1/1333* (2006.01)
*G06F 3/01* (2006.01)
*G06K 9/00* (2006.01)
*G06T 11/60* (2006.01)
*H04N 5/232* (2006.01)
*H04N 7/18* (2006.01)
*H04N 5/262* (2006.01)

(52) U.S. Cl.
CPC ... *G02B 27/0101* (2013.01); *G02F 1/133308* (2013.01); *G06F 3/013* (2013.01); *G06F 3/017* (2013.01); *G06K 9/00711* (2013.01); *G06K 9/00791* (2013.01); *G06T 11/60* (2013.01); *H04N 5/23238* (2013.01); *H04N 5/23258* (2013.01); *H04N 5/23267* (2013.01); *H04N 5/23293* (2013.01); *H04N 5/2628* (2013.01); *H04N 7/181* (2013.01); *H04N 7/183* (2013.01); *B60K 2350/2013* (2013.01); *B60K 2350/2052* (2013.01); *B60K 2350/352* (2013.01); *B60R 2300/105* (2013.01); *B60R 2300/205* (2013.01); *B60R 2300/303* (2013.01); *B60R 2300/806* (2013.01); *B60Y 2400/92* (2013.01); *G02B 27/01* (2013.01); *G03B 21/604* (2013.01); *G06T 2207/10016* (2013.01); *G06T 2207/20221* (2013.01); *G06T 2207/30252* (2013.01)

(56) References Cited

U.S. PATENT DOCUMENTS

| | | | |
|---|---|---|---|
| 2005/0128437 A1* | 6/2005 | Pingali | H04N 9/3194 353/69 |
| 2006/0181769 A1* | 8/2006 | Kumasawa | G03B 21/604 359/449 |
| 2007/0153236 A1 | 7/2007 | Quach | |
| 2010/0033564 A1* | 2/2010 | Lee | G03B 29/00 348/115 |
| 2012/0105808 A1 | 5/2012 | Feng et al. | |
| 2013/0257688 A1 | 10/2013 | Yamazaki et al. | |

FOREIGN PATENT DOCUMENTS

| | | |
|---|---|---|
| CN | 101644883 A | 2/2010 |
| CN | 101697036 A | 4/2010 |
| CN | 102087437 A | 6/2011 |
| CN | 202174999 U | 3/2012 |
| CN | 102455510 A | 5/2012 |
| CN | 102736249 A | 10/2012 |
| CN | 103792662 A | 5/2014 |
| CN | 203793139 U | 8/2014 |
| JP | 2006208606 A | 8/2006 |

* cited by examiner

FIG.1

Reflected Ambient Light Beam

VEHICLE-MOUNTED DISPLAY SYSTEM AND VEHICLE

CROSS-REFERENCE TO RELATED APPLICATION

This application is the U.S. national phase of PCT Application No. PCT/CN2015/084736 filed on Jul. 22, 2015, which claims a priority of the Chinese Utility Mode Application No. 201520161621.8 filed on Mar. 20, 2015 and a priority of the Chinese Utility Mode Application No. 201520207405.2 filed on Apr. 8, 2015, the disclosures of which are incorporated in their entirety by reference herein.

TECHNICAL FIELD

The present disclosure relates to the field of vehicle-mounted display technology, in particular to a vehicle-mounted display system and a vehicle.

BACKGROUND

Recently, some high-end vehicles have been equipped with vehicle-mounted display systems. For the vehicle-mounted display system, usually a projector is used to project a video image onto a separate projection screen or a front windshield of the vehicle, and the projected video image may be viewed by a driver when reflected by the projection screen or the front windshield. However, the projection screen or the front windshield is generally made of common glass and cannot shield light beams completely, i.e., the projected video image may be viewed by a person outside the vehicle. As a result, it is impossible to ensure the privacy of the video image, and it is difficult to meet the requirements of high-end business persons.

SUMMARY

An object of the present disclosure is to provide a vehicle-mounted display system and a vehicle, so as to improve the privacy of the existing vehicle-mounted display system.

In one aspect, the present disclosure provides a vehicle-mounted display system, including a transparent projection screen and a projector configured to project an image onto the transparent projection screen. A first polarizer is attached onto a lens of the projector, and a second polarizer is attached onto the transparent projection screen. The second polarizer has a polarization transmission direction crossing a polarization transmission direction of the first polarizer at such an angle as to enable a light beam from the projector and passing through the first polarizer and the second polarizer to be of an intensity smaller than an intensity of a light beam capable of being recognized by human eyes. The second polarizer has a polarization reflection direction perpendicular to its polarization transmission direction, so as to reflect a light component in the polarization reflection direction.

Alternatively, the polarization transmission direction of the second polarizer is perpendicular to the polarization transmission direction of the first polarizer.

Alternatively, the polarization transmission direction of the second polarizer is parallel to a horizontal plane.

Alternatively, the transparent projection screen is separately arranged above a dashboard in front of a driver, and the vehicle-mounted display system further includes a screen bracket connected to the transparent projection screen, and a screen bracket controller connected to the screen bracket and configured to control the screen bracket to move the transparent projection screen to a position above the dashboard in front of the driver so as to enable the transparent projection screen to be within a visual range of the driver, or control the screen bracket to withdraw the transparent projection screen so as to move the transparent projection screen out of the visual range of the driver.

Alternatively, the vehicle-mounted display system further includes a projector movement bracket and a projector movement bracket controller, the projector movement bracket is connected to the projector, and the projector movement bracket controller is connected to the projector movement bracket and configured to control the projector movement bracket to move the projector to a position in alignment with the transparent projection screen, or control the projector movement bracket to withdraw the projector.

Alternatively, an identical control assembly is used by the screen bracket controller for controlling the screen bracket and the projector movement bracket controller for controlling the projector movement bracket.

Alternatively, the transparent projector screen is a portion of a front windshield of a vehicle, and the vehicle-mounted display system further includes a projector rotation bracket connected to the projector, and a projector controller connected to the projector rotation bracket and configured to control the projector rotation bracket to adjust an image projection direction of the projector.

Alternatively, the vehicle-mounted display system further includes an image correction unit, which includes a gyroscope configured to acquire space angle information of the projector and arranged on the projector, an imaging plane angle information acquisition module configured to acquire space angle information of the front windshield as an imaging plane, a calculator connected to the imaging plane angle information acquisition module and configured to calculate a difference between a space angle of the imaging plane and a space angle of the projector to obtain a correspondence between a point on an image generated by the projector and a point on an image formed on the imaging plane, and an image corrector connected to the calculator and configured to correct the image generated by the projector in accordance with the correspondence.

Alternatively, the vehicle-mounted display system further includes a wheel monitoring camera connected to the projector and configured to take a video image of a vehicle guide wheel and transmit the video image to the projector.

Alternatively, the vehicle-mounted display system further includes a camera connected to the projector and configured to take a video image of an ambient environment of the vehicle and transmit the video image to the projector.

Alternatively, the vehicle-mounted display system further includes at least two rear-view cameras, a corrector connected to the at least two rear-view cameras and configured to perform distortion correction on video images taken by the rear-view cameras in accordance with parameters of the rear-view cameras and a distortion model, an image generator connected to the corrector and configured to perform angular-perspective transformation on the corrected video image from each camera in accordance with an mounting angle of the camera and a perspective transformation principle to generate a top-view image, and a stitching unit connected to the image generator and configured to stitch the top-view images from the at least two rear-view cameras in accordance with three-dimensional coordinates of a mounting position of each rear-view camera and a vehicle size to obtain a panoramic top-view image and transmit the panoramic top-view image to the projector.

Alternatively, the vehicle-mounted display system further includes a motion-sensing identification module configured to identify a user's gesture or a motion of an eyeball, a memory configured to store therein a correspondence between the user's gesture or the motion of the eyeball and a predetermined instruction, and an interaction controller connected to the motion-sensing identification module, the memory and the projector and configured to control the projector in accordance with the correspondence between the user's gesture or the motion of the eyeball and the predetermined instruction.

In another aspect, the present disclosure provides in some embodiments a vehicle-mounted display system, including a transparent liquid crystal display device. The transparent liquid crystal display device includes a transparent liquid crystal display screen, a transparent light-guide plate arranged at a side of the transparent liquid crystal display screen opposite to a viewer in a vehicle, an edge-type light source arranged at an light-entering side of the transparent light-guide plate, a first controller configured to control the transparent liquid crystal display screen to display an image, and a second controller configured to control on and off states of the light source.

Alternatively, the light-guide plate is a directional light-guide plate so as to guide the light beams approximately parallel to each other.

Alternatively, the directional light-guide plate includes a plurality of guiding mechanisms arranged at a bottom surface of light-guide plate and extending along a light-entering surface of the light-guide plate. Each guiding mechanism is a groove or ridge of an inverted trapezoidal shape, and has a bottom, an opening section, and a first beveled surface and a second beveled surface which are connected to the bottom and the opening section. The bottom of each guiding mechanism is protruded from the bottom surface of the light-guide plate, or a pattern structure is arranged between two adjacent guiding mechanisms and depressed inwardly in the bottom surface.

Alternatively, the vehicle-mounted display system further includes a screen bracket connected to the transparent liquid crystal display device, and a screen bracket controller connected to the screen bracket and configured to control the screen bracket to move the transparent liquid crystal display device to a position above a dashboard in front of a driver so as to enable the transparent liquid crystal display device to be within a visual range of the driver, or control the screen bracket to withdraw the transparent liquid crystal display device so as to move the transparent liquid crystal display device out of the visual range of the driver.

Alternatively, the vehicle-mounted display system further includes a wheel monitoring camera connected to the transparent liquid crystal display device and configured to take a video image of a vehicle guiding wheel and transmit the video image to the projector.

Alternatively, the vehicle-mounted display device further includes a camera connected to the transparent liquid crystal display device and configured to take a video image of an ambient environment of the vehicle and transmit the video image to the projector.

Alternatively, the vehicle-mounted display device further includes a motion-sensing identification module configured to identify a user's gesture or a motion of an eyeball, a memory configured to store therein a correspondence between the user's gesture or the motion of the eyeball and a predetermined instruction, and an interaction controller connected to the motion-sensing identification module, the memory and the transparent liquid crystal display device, and configured to control the transparent liquid crystal display device in accordance with the correspondence between the user's gesture or the motion of the eyeball and the predetermined instruction.

In yet another aspect, the present disclosure provides in some embodiments a vehicle including the above-mentioned vehicle-mounted display device.

According to the embodiments of the present disclosure, it is able to prevent the video image displayed by the vehicle-mounted display system from being viewed by a person outside the vehicle, thereby to improve the privacy of the vehicle-mounted display system.

DETAILED DESCRIPTION OF THE EMBODIMENTS

The present disclosure will be described hereinafter in conjunction with the drawings and embodiments. The following embodiments are for illustrative purposes only, but shall not be used to limit the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
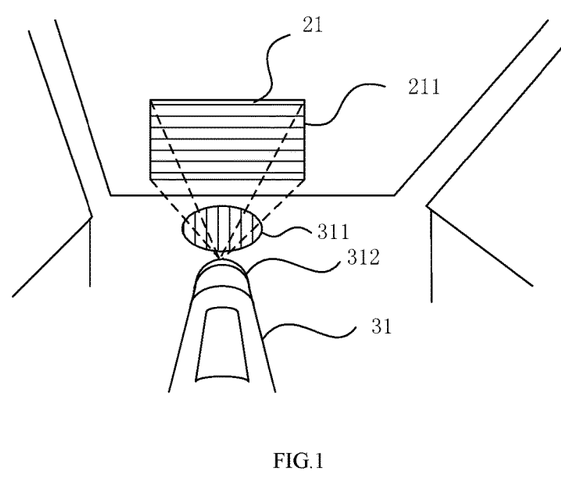
FIG. 1 is a schematic view showing a vehicle-mounted display system including a projector and a projection screen according to one embodiment of the present disclosure.

In order to improve the privacy of an existing vehicle-mounted display system, the present disclosure provides in some embodiments a vehicle-mounted display system which, referring to FIG. 1, includes a transparent projection screen 21 and a projector 31 configured to project an image onto the transparent projection screen 21. A first polarizer 311 is attached onto a lens 312 of the projector 31, and a second polarizer 211 is attached onto the transparent projection screen 21. The second polarizer 211 has a polarization transmission direction crossing a polarization transmission direction of the first polarizer 311 at such an angle as to enable a light beam from the projector 31 and passing through the first polarizer 311 and the second polarizer 211 to be of an intensity smaller than an intensity of a light beam capable of being recognized by human eyes. The second polarizer 211 has a polarization reflection direction perpendicular to its polarization transmission direction, so as to reflect a light component in the polarization reflection direction. In some embodiments, the polarization transmission direction of the second polarizer 211 is perpendicular to the polarization transmission direction of the first polarizer 311, and in some other embodiments, the polarization reflection direction of the second polarizer 211 is parallel to the polarization transmission direction of the first polarizer 311. The second polarizer 211 may be, e.g., a wire grid polarizer (WGP) or a polarization brightness enhancement film, so as to allow the transmission of light beams parallel to its polarization transmission direction and the reflection of light beams perpendicular to its polarization transmission direction.

A light beam projected by the projector 31 attached with the first polarizer 311 is a linearly polarized light beam. When the polarization transmission direction of the second polarizer 211 attached to the transparent projection screen 21 is perpendicular to the polarization transmission direction of the first polarizer 311, the linearly polarized light beam from the projector 31 cannot be transmitted through the transparent projection screen 21. At this time, it is impossible for a viewer outside a vehicle to view the video image projected onto the transparent projection screen 21, thereby it is able to improve the privacy of the vehicle-mounted display system. Moreover, the polarization reflection direction of the second polarizer 211 is parallel to the polarization transmission direction of the first polarizer 311, so the linearly polarized light beam from the projector 31 may be reflected by the second polarizer 211, so as to improve brightness of the video image displayed on the transparent projection screen 21. In addition, an ambient light beam may still be transmitted through the transparent projection screen 21 into the vehicle, so the driver may still view the ambient environments outside the vehicle.

Figure 2:
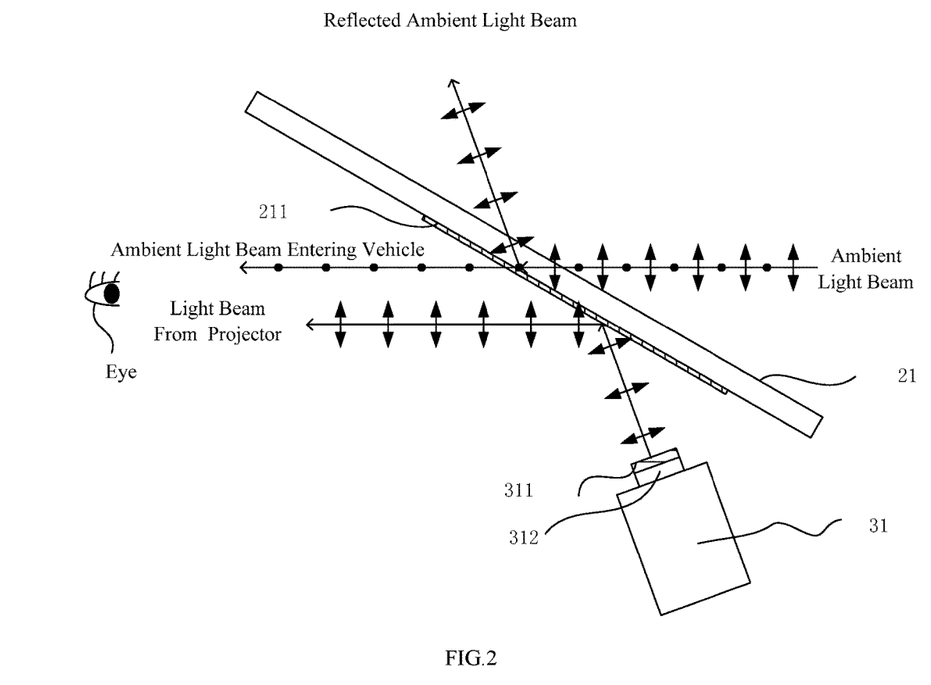
FIG. 2 is another schematic view showing the vehicle-mounted display system including the projector and the projection screen according to one embodiment of the present disclosure.

In some embodiments, referring to FIG. 2, the polarization transmission direction of the second polarizer 211 attached to the transparent projection screen 21 may also be parallel to a horizontal plane. At this time, the polarization transmission direction of the first polarizer 311 attached onto the lens 312 of the projector 31 is perpendicular to the horizontal direction. The horizontal plane refers to a plane approximately parallel to a road surface. Most of the light beams transmitted into the vehicle (e.g., light beams reflected by the road surface or by any other vehicles) are linearly polarized light beams each with a polarization direction perpendicular to a reflective surface of the second polarizer 211, so it is able to prevent the driver from being adversely affected by the reflected light beams.

In the above-mentioned embodiments, the transparent projection screen 21 may be a separate projection screen arranged above the dashboard in front of a driver's seat or a passenger's seat. The transparent projection screen 21 may be a transparent glass screen made of common glass, or glass doped with particles, so as to enhance the reflective effect.

When the projection screen is arranged above the dashboard in front of the driver's seat and it is required to display a video image, the video image may be projected onto the projection screen. When it is unnecessary to use the projection screen but the projection screen is still arranged in front of the driver, a viewing field of the driver may be adversely affected somehow.

In order to solve this problem, in some embodiments of the present disclosure, the vehicle-mounted display system may further include a screen bracket connected to the transparent projection screen, and a screen bracket controller connected to the screen bracket and configured to, when it is required to use the transparent projection screen, control the screen bracket to move the transparent projection screen to a position above the dashboard in front of the driver so as to enable the transparent projection screen to be within a visual range of the driver, or when it is unnecessary to use the transparent projection screen, control the screen bracket to withdraw the transparent projection screen so as to move the transparent projection screen out of the visual range of the driver and prevent the viewing field of the driver from being shielded.

The structure of the screen bracket is not particularly defined herein. For example, the screen bracket may be a fixed shaft, and the screen bracket controller may include an electric motor connected to the fixed shaft and an electric motor controller. The fixed shaft is configured to fix a bottom of the transparent projection screen and the electric motor is controlled by the electric motor controller so as to drive the fixed shaft to move, thereby to move the transparent projection screen.

In some embodiments, the vehicle-mounted display system may further include a projector movement bracket and a projector movement bracket controller. The projector movement bracket is connected to the projector, and the projector movement bracket controller is connected to the projector movement bracket and configured to, when it is required to use the projector, control the projector movement bracket to move the projector to a position in alignment with the transparent projection screen, or when it is unnecessary to use the projector, control the projector movement bracket to withdraw the projector.

In some embodiments, an identical control assembly may be used by the screen bracket controller for controlling the screen bracket and the projector movement bracket controller for controlling the projector movement bracket, so as to move and withdraw the transparent projection screen and the projector simultaneously.

In the embodiments of the present disclosure, apart from being a separate one, the transparent projection screen 21 may also be a portion of a front windshield of the vehicle. The front windshield may be made of common glass, or glass doped with particles, so as to enhance the reflective effect.

When the transparent projection screen 21 is a portion of the front windshield of the vehicle, the vehicle-mounted display system may further include a projector rotation bracket connected to the projector, and a projector controller connected to the projector rotation bracket and configured to control the projector rotation bracket to adjust an image projection direction of the projector, thereby to enable the projector to project the video image onto any designated position on the front windshield.

Through the projector controller, it is able to change a projection direction of the video image for the projector in accordance with the practical need, thereby to improve the user experience. For example, when the driver wants to view the video image, the video image maybe projected by the projector onto a region in front of the driver, and when a passenger in the passenger's seat wants to view the video image, the projector may be rotated so as to project the video image onto a region in front of the passenger's seat.

When the projector is rotated under the control of the projector controller, the projection direction of the video image is changed, and the projected video image may be distorted due to the position of the projector. In order to solve this problem, the vehicle-mounted display system may further include an image correction unit, which includes a gyroscope configured to acquire space angle information of the projector and arranged on the projector, an imaging plane angle information acquisition module configured to acquire space angle information of the front windshield as an imaging plane, a calculator connected to the imaging plane angle information acquisition module and configured to calculate a difference between a space angle of the imaging plane and a space angle of the projector to obtain a correspondence between a point on an image generated by the projector and a point on an image formed on the imaging plane, and an image corrector connected to the calculator and configured to correct the image generated by the projector in accordance with the correspondence.

Through the image correction unit, it is able to ensure the user to view an accurate image on the front windshield, thereby to prevent the video image from being distorted due to the position of the projector.

In order to facilitate the human-machine interaction, in the embodiments of the present disclosure, the vehicle-mounted display system may further include a motion-sensing identification module, e.g., a common camera or an infrared camera, configured to identify a user's gesture or a motion of an eyeball, a storage module, e.g., a memory, configured to store therein a correspondence between the user's gesture or the motion of the eyeball and a predetermined instruction, and an interaction controller connected to the motion-sensing identification module, the memory and the projector and configured to control the projector in accordance with the correspondence between the user's gesture or the motion of the eyeball and the predetermined instruction.

For example, the user may make a gesture of spreading his palm from a fisted state, and a predetermined instruction corresponding to this gesture stored in the memory is "turning on the projector". At this time, the interaction controller may send the instruction to the projector controller so as to turn on the projector.

In addition, the user may also make a gesture of fisting this palm from a spreading state, and a predetermined instruction corresponding to this gesture stored in the memory is "turning off the projector" (i.e., stopping displaying the video image on the front windshield). At this time, the interaction controller may send the instruction to the projector controller so as to turn off the projector.

In addition, the user may also make a gesture of dragging to the left or right, and a predetermined instruction corresponding to this gesture of dragging to the right stored in the memory is "rotating the projector so as to move the video image from the front windshield in front of the driver to the front windshield in front of the passenger's seat". At this time, the interaction controller may send this instruction to the projector controller, so as to control the projector to rotate and move the video image from the front windshield in front of the driver to the front windshield in front of the passenger's seat. A predetermined instruction corresponding to the gesture of dragging to the left stored in the memory is "rotating the projector so as to move the video image from the front windshield in front of the passenger's seat" to the front windshield in front of the driver. At this time, the interaction controller may send this instruction to the projector controller, so as to rotate the projector and move the video image from the front windshield in front of the passenger's seat to the front windshield in front of the driver.

Of course, the video image projected by the projector may be moved to any other desired positions through the other gestures.

Figures 3, 4:
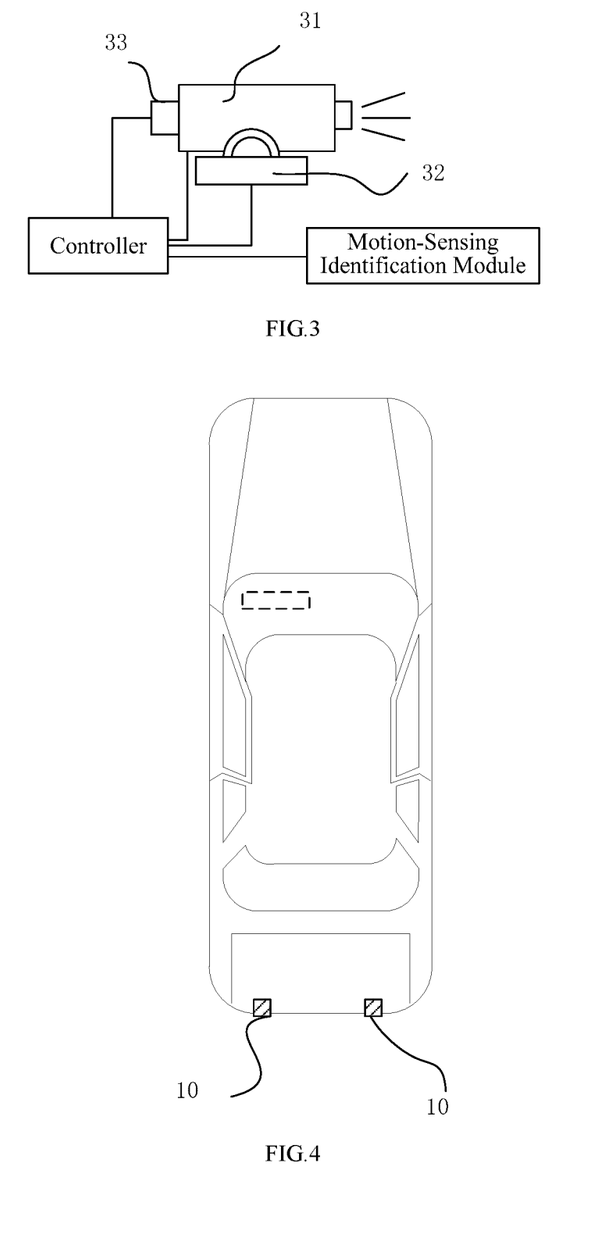
FIG. 3 is yet another schematic view showing the vehicle-mounted display system including the projector and the projection screen according to one embodiment of the present disclosure.
FIG. 4 is a schematic view showing the vehicle-mounted display system including rear-view cameras according to one embodiment of the present disclosure.

Referring to FIG. 3 which shows an alternative embodiment of the vehicle-mounted display system, the vehicle-mounted display system includes the projector 31, the projector rotation bracket 32, a controller, the gyroscope 33, an input module (not shown), the motion-sensing identification module and the memory (not shown). The projector 31, the projector rotation bracket 32, the gyroscope 33, the input module, and the motion-sensing identification module are those mentioned above. The controller includes the above-mentioned projector controller, a computing chip, the image correction unit and the interaction controller, and it is configured to execute the functions of the projector controller, the computing chip, the image correction unit and the interaction controller.

For a traditional vehicle, the ambient information around the vehicle may be transmitted to the driver through a left rear-view mirror and a right rear-view mirror arranged at both sides of a vehicle body and an intermediate rear-view mirror arranged inside the vehicle, so as to guide the driver. However, there is such a drawback that, when the vehicle is running through a narrow road, the left and right rear-view mirrors protruding from the vehicle body may be easily scraped.

To overcome this drawback, referring to FIG. 4, the vehicle-mounted display system may further include a rear-view camera 10 connected to the projector and configured to take a video image of an ambient environment of the vehicle and transmit the video image to the projector.

In the embodiments of the present disclosure, the vehicle-mounted display system may include two rear-view cameras 10 arranged at a rear end of the vehicle. Each rear-view camera 10 may be a 360° omnidirectional camera, a rotatable camera, or an ultra-wide angle camera, so as to acquire the video images of the ambient environments at the left, right and rear sides of the vehicle. Of course, in some other embodiments, the number of the rear-view cameras 10 is not limited to two, and the position of these rear-view cameras 10 is not limited to the rear end of the vehicle.

According to the vehicle-mounted display system in the embodiments of the present disclosure, the existing rear-view mirrors are replaced with the rear-view cameras for taking the video images of the ambient environments of the vehicle, and the video images taken by the rear-view cameras are projected by the projector onto the transparent projection screen. As a result, it is able to prevent the rear-view mirrors from being scraped while ensuring the acquisition of the ambient information around the vehicle by the driver.

In some embodiments, the vehicle-mounted display device may include at least two rear-view cameras, a corrector connected to the at least two rear-view cameras and configured to perform distortion correction on video images taken by the rear-view cameras in accordance with parameters of the rear-view cameras and a distortion model, an image generator connected to the corrector and configured to perform angular-perspective transformation on the corrected video image from each camera in accordance with an mounting angle of the camera and a perspective transformation principle to generate a top-view image, and a stitching unit connected to the image generator and configured to stitch the top-view images from the at least two rear-view cameras in accordance with three-dimensional coordinates of a mounting position of each rear-view camera and a vehicle size to obtain a panoramic top-view image and transmit the panoramic top-view image to the projector.

The above panoramic top-view image may be used to provide position information of the vehicle relative to a surrounding object to the driver intuitively, and it is particularly adapted to a parking scene.

In some embodiments, the vehicle-mounted display system may further include a wheel monitoring camera connected to the projector and configured to take a video image of a vehicle guide wheel and transmit the video image to the projector, so as to enable the driver to acquire a posture of the guide wheel during such a situation as parking, thereby to facilitate the parking.

In the embodiments of the present disclosure, the projector is used in combination with the transparent projection screen so as to display the video image. Of course, the video image may also be displayed in any other modes, e.g., by a transparent liquid crystal display device. However, when the transparent liquid crystal display device is used, it is also impossible to ensure the privacy.

Figure 5:
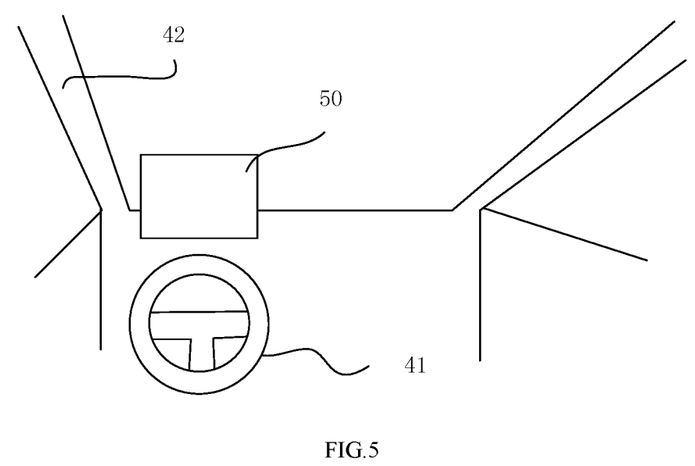
FIG. 5 is a schematic view showing the vehicle-mounted display system including a transparent liquid crystal display device according to one embodiment of the present disclosure.

In order to solve this problem, referring to FIG. 5, another vehicle-mounted display system includes a transparent liquid crystal display device 50 arranged above a dashboard in front of the driver's seat or a passenger's seat. The transparent liquid crystal display device 50 includes a transparent liquid crystal display screen, a transparent light-guide plate (e.g., a glass light-guide plate) arranged at a side of the transparent liquid crystal display screen opposite to a viewer in a vehicle, an edge-type light source arranged at an light-entering side of the transparent light-guide plate, a first controller configured to control the transparent liquid crystal display screen to display an image, and a second controller configured to control on and off states of the light source.

Through the transparent light-guide plate and the second controller for controlling the on and off states of the light source, it is able to switch the vehicle-mounted display device between a protection display mode and a common display mode. In FIG. 5, 41 represents a steering wheel, and 42 represents a pillar A. A surface of the transparent light-guide plate away from a display panel is provided with a plurality of mesh-like structures, and the transparent light-guide plate has a light-entering surface connected to a surface of the transparent light-guide plate away from the display panel and a surface of the transparent light-guide plate facing the display panel. Each mesh-like structure is a concave structure formed at the surface of the transparent light-guide plate away from the display panel, or each mesh-like structure consists of scattering particles arranged at the surface of the transparent light-guide plate away from the display panel.

To be specific, when the light source is turned on, the light-guide plate may emit light. At this time, a white region may be viewed outside the vehicle at a position corresponding to the transparent liquid crystal display screen, while the desired video image may be viewed by a viewer in the vehicle through the transparent liquid crystal screen, so as to achieve an anti-leakage function. When the light source is turned off, the light-guide plate may not emit light. At this time, when the ambient light beams outside the vehicle are used as a background, it is able to display the video image on the scenes/road conditions outside the vehicle.

In some embodiments, the light-guide plate may be a directional light-guide plate, so as to guide the light beams approximately parallel to each other. At this time, when the transparent liquid crystal display device is arranged at a region in front of the driver, the passenger in the passenger's seat may not view the video image displayed by the transparent liquid crystal display device, and when the transparent liquid crystal display device is arranged at a region in front of the passenger, the drier may not view the video image. As a result, it is able to prevent the driver and passenger from interfering each other. The directional light-guide plate may, e.g., include a plurality of guiding mechanisms arranged at a bottom surface of light-guide plate and extending along a light-entering surface of the light-guide plate. Each guiding mechanism is a groove or ridge of an inverted trapezoidal shape, and has a bottom, an opening section, and a first beveled surface and a second beveled surface each connected to the bottom and the opening section. The bottom of each guiding mechanism may be protruded from the bottom surface of the light-guide plate, or a pattern structure may be arranged between two adjacent guiding mechanisms and depressed inwardly in the bottom surface.

In some embodiments, the vehicle-mounted display system may further include a screen bracket connected to the transparent liquid crystal display device 50, and a screen bracket controller connected to the screen bracket and configured to, when it is required to use the transparent liquid crystal display device 50, control the screen bracket to move the transparent liquid crystal display device to a position above a dashboard in front of a driver so as to enable the transparent liquid crystal display device to be within a visual range of the driver, or when it is unnecessary to use the transparent liquid crystal display device 50, control the screen bracket to withdraw the transparent liquid crystal display device so as to move the transparent liquid crystal display device out of the visual range of the driver, thereby to prevent the viewing field of the driver from being shielded.

The structure of the screen bracket is not particularly defined herein, and for example, it may be a fixed shaft. The screen bracket controller may include an electric motor connected to the fixed shaft and an electric motor controller. The fixed shaft is configured to fix a bottom of the transparent liquid crystal display device 50, and the electric motor is controlled by the electric motor controller so as to drive the fixed shaft to move, thereby to move the transparent liquid crystal display device 50.

In some embodiments, the vehicle-mounted display system may further include a motion-sensing identification module configured to identify a user's gesture or a motion of an eyeball, a memory configured to store therein a correspondence between the user's gesture or the motion of the eyeball and a predetermined instruction, and an interaction controller connected to the motion-sensing identification module, the memory and the transparent liquid crystal display device, and control the transparent liquid crystal display device in accordance with the correspondence between the user's gesture or the motion of the eyeball and the predetermined instruction.

For example, the user may make a gesture of spreading his palm from a fisted state, and a predetermined instruction corresponding to this gesture stored in the memory is "turning on the transparent liquid crystal display device". At this time, the interaction controller may send the instruction to the transparent liquid crystal display device so as to turn on the transparent liquid crystal display device.

In addition, the user may also make a gesture of fisting this palm from a spreading state, and a predetermined instruction corresponding to this gesture stored in the memory is "turning off the transparent liquid crystal display device". At this time, the interaction controller may send the instruction to the transparent liquid crystal display device, so as to turn off the transparent liquid crystal display device.

In addition, in the embodiments of the present disclosure, the vehicle-mounted display system may further include a sliding rail, on which the transparent liquid crystal display device is arranged. The user may also make a gesture of dragging to the left or right, and a predetermined instruction corresponding to this gesture of dragging to the right stored in the memory is "sliding the transparent liquid crystal display device along the sliding rail so as to move the transparent liquid crystal display device in front of the driver to be in front of the passenger's seat". At this time, the interaction controller may send this instruction to the sliding rail, so as to control the transparent liquid crystal display device to move.

In order to overcome the drawback that the rear-view mirrors of the vehicle are easily scraped, the vehicle-mounted display system may further include two rear-view cameras connected to the projector and configured to take a video image of an ambient environment of the vehicle and transmit the video image to the transparent liquid crystal display device.

The rear-view cameras may be arranged at a rear end of the vehicle. Each rear-view camera may be a 360° omnidirectional camera, a rotatable camera, or an ultra-wide angle camera, so as to acquire the video images of the ambient environments at the left, right and rear sides of the vehicle. Of course, in some other embodiments, the number of the rear-view cameras is not limited to two, and the position of these rear-view cameras is not limited to the rear end of the vehicle.

According to the vehicle-mounted display system in the embodiments of the present disclosure, the existing rear-view mirrors are replaced with the rear-view cameras for taking the video images of the ambient environments of the vehicle, and the video images taken by the rear-view cameras are displayed by the transparent liquid crystal display device. As a result, it is able to prevent the rear-view mirrors from being scraped while ensuring the acquisition of the ambient information around the vehicle by the driver.

In some embodiments, the vehicle-mounted display device may include at least two rear-view cameras, a corrector connected to the at least two rear-view cameras and configured to perform distortion correction on video images taken by the rear-view cameras in accordance with parameters of the rear-view cameras and a distortion model, an image generator connected to the corrector and configured to perform angular-perspective transformation on the corrected video image from each camera in accordance with an mounting angle of the camera and a perspective transformation principle to generate a top-view image, and a stitching unit connected to the image generator and configured to stitch the top-view images from the at least two rear-view cameras in accordance with three-dimensional coordinates of a mounting position of each rear-view camera and a vehicle size to obtain a panoramic top-view image and transmit the panoramic top-view image to the projector.

The above panoramic top-view image may be used to provide position information of the vehicle relative to a surrounding object to the driver intuitively, and it is particularly adapted to a parking scene.

In some embodiments of the present disclosure, the vehicle-mounted display system may further include a wheel monitoring camera connected to the projector and configured to take a video image of a vehicle guide wheel and transmit the video image to the projector, so as to enable the driver to acquire a posture of the guide wheel during such a situation as parking, thereby to facilitate the parking.

The present disclosure further provides in some embodiments a vehicle including the above-mentioned vehicle-mounted display system.

The above are merely the preferred embodiments of the present disclosure, it should be appreciated that, a person skilled in the art may make further modifications and improvements without departing from the principle of the present disclosure, and these modifications and improvements shall also fall within the scope of the present disclosure.

What is claimed is:

1. A vehicle-mounted display system, comprising a transparent projection screen and a projector configured to project an image onto the transparent projection screen, wherein
    a first polarizer is attached onto a lens of the projector, and
    a second polarizer is attached onto the transparent projection screen;
    the second polarizer has a polarization transmission direction crossing a polarization transmission direction of the first polarizer at such an angle as to enable a light beam from the projector and passing through the first polarizer and the second polarizer to be of an intensity smaller than an intensity of a light beam capable of being recognized by human eyes; and
    the second polarizer has a polarization reflection direction perpendicular to its polarization transmission direction, so as to reflect a light component in the polarization reflection direction,
    wherein the transparent projection screen is separately arranged, and the vehicle-mounted display system further comprises: a screen bracket connected to the transparent projection screen; and a screen bracket controller connected to the screen bracket and configured to control the screen bracket to move the transparent projection screen to a position above a dashboard in front of the driver so as to enable the transparent projection screen to be within a visual range of the driver, or control the screen bracket to withdraw the transparent projection screen so as to move the transparent projection screen out of the visual range of the driver,
    the vehicle-mounted display system further comprises a projector movement bracket and a projector movement bracket controller, wherein the projector movement bracket is connected to the projector, and the projector movement bracket controller is connected to the projector movement bracket and configured to control the projector movement bracket to move the projector to a position in alignment with the transparent projection screen, or control the projector movement bracket to withdraw the projector.

2. The vehicle-mounted display system according to claim 1, wherein the polarization transmission direction of the second polarizer is perpendicular to the polarization transmission direction of the first polarizer.

3. The vehicle-mounted display system according to claim 1, wherein the polarization transmission direction of the second polarizer is parallel to a horizontal plane.

4. The vehicle-mounted display system according to claim 1, wherein an identical control assembly is used by the screen bracket controller for controlling the screen bracket and the projector movement bracket controller for controlling the projector movement bracket.

5. The vehicle-mounted display system according to claim 1, wherein the transparent projector screen is a portion of a front windshield of a vehicle, and the vehicle-mounted display system further comprises:
- a projector rotation bracket connected to the projector; and
- a projector controller connected to the projector rotation bracket and configured to control the projector rotation bracket to adjust an image projection direction of the projector.

6. The vehicle-mounted display system according to claim 5, further comprising an image correction unit, wherein the image correction unit comprises:
- a gyroscope configured to acquire space angle information of the projector and arranged on the projector;
- an imaging plane angle information acquisition module configured to acquire space angle information of the front windshield as an imaging plane;
- a calculator connected to the imaging plane angle information acquisition module and configured to calculate a difference between a space angle of the imaging plane and a space angle of the projector to obtain a correspondence between a point on an image generated by the projector and a point on an image formed on the imaging plane; and
- an image corrector connected to the calculator and configured to correct the image generated by the projector in accordance with the correspondence.

7. The vehicle-mounted display system according to claim 1, further comprising:
- a wheel monitoring camera connected to the projector and configured to take a video image of a vehicle guide wheel and transmit the video image to the projector.

8. The vehicle-mounted display system according to claim 1, further comprising:
- a camera connected to the projector and configured to take a video image of an ambient environment of the vehicle and transmit the video image to the projector.

9. The vehicle-mounted display system according to claim 1, further comprising:
- at least two rear-view cameras;
- a corrector connected to the at least two rear-view cameras and configured to perform distortion correction on video images taken by the rear-view cameras in accordance with parameters of the rear-view cameras and a distortion model;
- an image generator connected to the corrector and configured to perform angular-perspective transformation on the corrected video image from each camera in accordance with an mounting angle of the camera and a perspective transformation principle to generate a top-view image; and
- a stitching unit connected to the image generator and configured to stitch the top-view images from the at least two rear-view cameras in accordance with three-dimensional coordinates of a mounting position of each rear-view camera and a vehicle size to obtain a panoramic top-view image and transmit the panoramic top-view image to the projector.

10. The vehicle-mounted display system according to claim 1, further comprising:
- a motion-sensing identification module configured to identify a user's gesture or a motion of an eyeball;
- a memory configured to store therein a correspondence between the user's gesture or the motion of the eyeball and a predetermined instruction; and
- an interaction controller connected to the motion-sensing identification module, the memory and the projector, and configured to control the projector in accordance with the correspondence between the user's gesture or the motion of the eyeball and the predetermined instruction.

11. A vehicle, comprising the vehicle-mounted display system according to claim 1.

12. A vehicle-mounted display system, comprising a transparent projection screen and a projector configured to project an image onto the transparent projection screen, wherein
- a first polarizer is attached onto a lens of the projector, and a second polarizer is attached onto the transparent projection screen;
- the second polarizer has a polarization transmission direction crossing a polarization transmission direction of the first polarizer at such an angle as to enable a light beam from the projector and passing through the first polarizer and the second polarizer to be of an intensity smaller than an intensity of a light beam capable of being recognized by human eyes; and
- the second polarizer has a polarization reflection direction perpendicular to its polarization transmission direction, so as to reflect a light component in the polarization reflection direction,
- wherein the transparent projector screen is a portion of a front windshield of a vehicle, and the vehicle-mounted display system further comprises:
- a projector rotation bracket connected to the projector; and
- a projector controller connected to the projector rotation bracket and configured to control the projector rotation bracket to adjust an image projection direction of the projector.

13. The vehicle-mounted display system according to claim 12, wherein the polarization transmission direction of the second polarizer is perpendicular to the polarization transmission direction of the first polarizer.

14. The vehicle-mounted display system according to claim 12, wherein the polarization transmission direction of the second polarizer is parallel to a horizontal plane.

15. A vehicle-mounted display system, comprising a transparent projection screen and a projector configured to project an image onto the transparent projection screen, wherein
- a first polarizer is attached onto a lens of the projector, and a second polarizer is attached onto the transparent projection screen;
- the second polarizer has a polarization transmission direction crossing a polarization transmission direction of the first polarizer at such an angle as to enable a light beam from the projector and passing through the first polarizer and the second polarizer to be of an intensity smaller than an intensity of a light beam capable of being recognized by human eyes; and
- the second polarizer has a polarization reflection direction perpendicular to its polarization transmission direction, so as to reflect a light component in the polarization reflection direction,
- wherein the vehicle-mounted display system further comprises a wheel monitoring camera connected to the projector and configured to take a video image of a vehicle guide wheel and transmit the video image to the projector.

16. The vehicle-mounted display system according to claim 15, wherein the polarization transmission direction of the second polarizer is perpendicular to the polarization transmission direction of the first polarizer.

17. A vehicle-mounted display system, comprising a transparent projection screen and a projector configured to project an image onto the transparent projection screen, wherein
　　a first polarizer is attached onto a lens of the projector, and a second polarizer is attached onto the transparent projection screen;
　　the second polarizer has a polarization transmission direction crossing a polarization transmission direction of the first polarizer at such an angle as to enable a light beam from the projector and passing through the first polarizer and the second polarizer to be of an intensity smaller than an intensity of a light beam capable of being recognized by human eyes; and
　　the second polarizer has a polarization reflection direction perpendicular to its polarization transmission direction, so as to reflect a light component in the polarization reflection direction,
　　wherein the vehicle-mounted display system further comprises:
　　at least two rear-view cameras;
　　a corrector connected to the at least two rear-view cameras and configured to perform distortion correction on video images taken by the rear-view cameras in accordance with parameters of the rear-view cameras and a distortion model;
　　an image generator connected to the corrector and configured to perform angular-perspective transformation on the corrected video image from each camera in accordance with an mounting angle of the camera and a perspective transformation principle to generate a top-view image; and
　　a stitching unit connected to the image generator and configured to stitch the top-view images from the at least two rear-view cameras in accordance with three-dimensional coordinates of a mounting position of each rear-view camera and a vehicle size to obtain a panoramic top-view image and transmit the panoramic top-view image to the projector.

18. The vehicle-mounted display system according to claim 17, wherein the polarization transmission direction of the second polarizer is perpendicular to the polarization transmission direction of the first polarizer.

* * * * *